United States Patent Office 3,185,920
Patented May 25, 1965

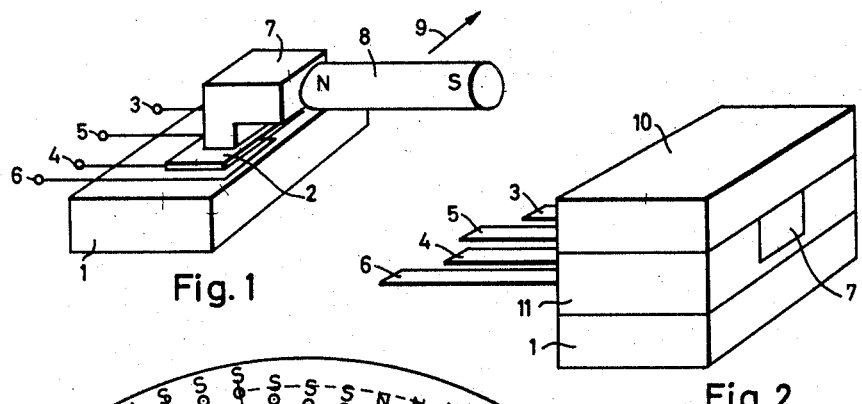
Fig. 1
Fig. 2
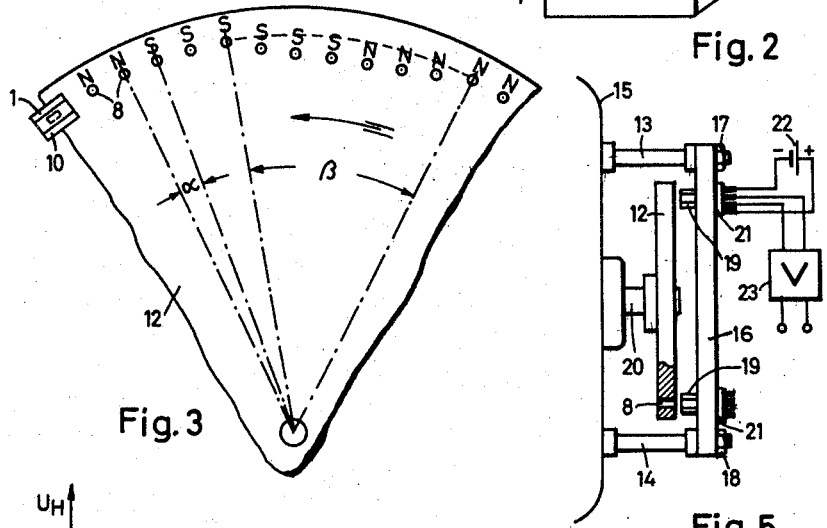
Fig. 3
Fig. 5
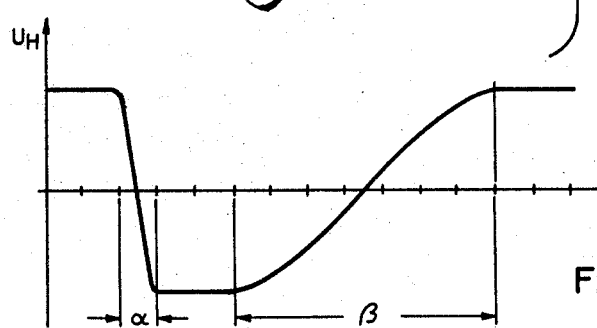
Fig. 4

3,185,920
SIGNAL-VOLTAGE GENERATING DEVICE
Julius Brunner, Nurnberg, Germany, assignor to Siemens-Schuckertwerke Aktiengesellschaft, Berlin-Siemensstadt, Germany, a corporation of Germany
Filed Sept. 27, 1961, Ser. No. 141,167
Claims priority, application Germany, Sept. 30, 1960, S 70,731
4 Claims. (Cl. 323—94)

My invention relates to a device for generating a signal or program voltage of any desired curve shape application, for example, in position- or travel-responsive control and regulating systems such as used in conjunction with data-processing equipment or machine tools and other fabricating and processing machinery.

According to a prior disclosure (U.S. application Serial No. 74,352, filed December 7, 1960, by H. J. Lippmann and F. Kuhrt for Program Control Device, assigned to the assignee of the present invention), a signal voltage for such purposes can be produced with the aid of a Hall-voltage generator responding to one or more permanent magnets that travel past the generator, preferably in a periodic sequence. If these permanent magnets are equally spaced from each other along the travel path but are given alternating polarity, the device will generate an alternating voltage whose number of periods or changes in polarity is a measure of the travel distance traversed by the carrier of the permanent magnet. When the magnet carrier is a rotating disc, the angle of disc rotation can thus be translated into pulses of output voltage suitable for digital control or digital data processing.

If the permanent magnets are mounted on the disc not along a concentric circle but along some other curve or line, such as a chord, then the magnetic field acting upon the Hall-voltage generating transducer is correspondingly varied so that in this manner a variety of voltage programs of predetermined course can be produced. It has further been proposed to provide the above-mentioned transducer with magnetizable legs or pole sheets which jointly straddle the peripheral portion of the circular disc, and to mount the semiconductor Hall plate of the transducer in the plane of the circular disc.

While such signal-voltage generating devices are fundamentally capable of serving the above-mentioned voltage generating functions, I have found that they are amenable to considerable further improvement; and it is therefore an object of my invention to devise a signal-voltage generator, also on the basis of a Hall generator cooperating with permanent magnet means on movable structure, that can be given a more compact over-all size for given electrical requirements and affords generating a signal voltage with steeper fronts or flanks than heretofore attained.

To this end, and in accordance with a feature of my invention, relating to a signal-generating device generally of the above-mentioned type, I dispose the semiconductor Hall plate on a larger ferrite plate member in face-to-face engagement therewith in a plane that extends parallel to the plane jointly defined at the location of the Hall plate by the travel direction of the above-mentioned magnet-carrying structure and the magnetic axis of the permanent magnet; and I further provide the Hall generator with an essentially angular or L-shaped bridge piece of ferrite which has one planar end in face-to-face engagement with the semiconductor Hall plate on the side opposite the above-mentioned ferrite plate member, whereas the other end of the bridge piece faces the pole of each permanent magnet traveling past the bridge piece. According to another feature of my invention, the cross section of the L-shaped bridge member, or at least the width of this member, is made approximately equal to the corresponding cross section or dimension of the active front face of the permanent magnet.

Such a signal-voltage generating device according to the invention is applicable for linear motion of the magnet-carrying structure, for example in conjunction with the reciprocating bed or slider structure of a machine tool, as well as for circular motion of the carrier structure. In the latter case, the ferrite plate member is mounted away from the circular path of the permanent magnets. If program voltages are to be produced in dependence upon the rotational angle of a circular disc, the polarity and the radial spacing of the permanent magnet mounted on the peripheral zone of the disc are to be chosen in accordance with the particular program desired.

For further explanation, reference will be made in the following to the embodiment of a signal-voltage generating device according to the invention illustrated by way of example on the accompanying drawing in which:

FIG. 1 shows schematically a perspective view of the Hall-voltage generating parts and one of the permanent magnets of the device.

FIG. 2 is a perspective view of the Hall-generator component of the device.

FIG. 3 shows schematically the Hall-voltage generator in relation to part of a circular disc which carries a number of permanent magnets.

FIG. 4 is a voltage-travel diagram explanatory of the operation of the same device.

FIG. 5 is a lateral view of the device and also illustrates part of an appertaining electric drive motor and a diagram of electric circuit connections.

The transducer head of the device comprises a base plate member 1 of ferrite on which a Hall plate 2 of semiconductor material is located in face-to-face relation and preferably in immediate contact with the ferrite member 1. The Hall plate 2 consists preferably of indium antimonide (InSb) or indium arsenide (InAs) and may have a thickness in the order of one micron. One way of placing it upon the plate member 1 is to directly deposit the semiconductor material from the vaporous phase. The Hall plate 2 is of rectangular shape. Its two narrow edges are provided with metallic electrodes that extend over the entire length of these edges and are connected with terminals 3 and 4 through which an energizing current, for example direct current of constant voltage, is passed through the plate as long as the device is in operative condition. Located on the two long edges of the Hall plate 2, midway between the two current supply electrodes, are respective probe (Hall) electrodes which are connected to output terminals 5 and 6 from which the signal output voltage of the device is taken.

When such a Hall plate is not subjected to a magnetic field while current is passing between terminals 3 and 4, the two Hall electrodes have the same potential so that no output voltage appears between terminals 5 and 6. When the Hall plate is traversed by energizing current and is simultaneously subjected to a magnetic field having a component perpendicular to the plane of the Hall plate, the Hall electrodes assume respectively different potentials, thus producing across terminals 5 and 6 an output voltage whose magnitude and polarity depend upon the intensity and polarity respectively of the magnetic field. The just-mentioned magnetic field is produced and varied by the traveling permanent magnets with which the movable structure of the device is equipped, as will be described presently.

The Hall-generator component of the device further comprises an L-shaped bridge piece 7 of ferrite which serves to direct the magnetic flux from the permanent magnet 8 onto and through the Hall plate 2. The travel direction of the permanent magnet 8 in FIG. 1 is indicated by an arrow 9, but the travel may also be in the opposite direction. The entire transducer head is preferably fixedly mounted, and the permanent magnet is fastened to movable structure of the device, for example to the reciprocating bed or slider of a machine tool, a rotating circular disc or other member whose travel is to determine the course of the signal or program voltage to be generated.

As is apparent from FIG. 2, the transducer head is preferably covered by a non-magnetic cover plate 10, for example of ceramic material, and the intermediate spaces are preferably filled with a suitable insulating mass 11, for example casting resin. For supplying energizing current to the Hall plate and taking the output voltage from its Hall electrodes, corresponding metal strips may be provided. Such strips are illustrated in FIG. 2 where they are denoted by 3 to 6 in accordance with the correspondingly denoted terminals in FIG. 1. As an example for the actual size of the transducer head it may be mentioned that its length need only be about 10 mm., and its width and height about 5 mm. each, although other dimensions may be chosen.

In the preferred embodiment, further described below with reference to FIGS. 3 and 5, a number of pin-shaped permanent magnets 8 according to FIG. 1 are mounted along a peripheral zone of a circular disc 12 which is kept in rotation at uniform speed during the operation of the device for the purpose of generating a signal or program voltage of a desired, predetermined course, such as exemplified by the diagram shown in FIG. 4.

In the diagram, the angle of rotation of the magnet-carrying disc is indicated on the abscissa, and the signal output voltage $U_H$ on the ordinate. According to the diagram, the signal voltage $U_H$ passes from a positive maximum value through zero to a negative maximum within a narrow angular range $\alpha$, then remains at the negative maximum value during an additional amount of angular travel, and thereafter passes again through zero to a positive maximum value but this time in a very gradual manner and through a wide angular range $\beta$.

The magnetic orientation of the pin-shaped magnets 8 on disc 12 according to FIG. 3 and the radial spacing of these magnets from the axis of disc rotation in FIG. 3 are such that the resulting output voltage between the terminals 5 and 6 of the device is in accordance with the program voltage of FIG. 4. The small angular range $\alpha$ according to FIG. 4, also indicated in FIG. 3, is predetermined by the peripheral spacing of each two permanent magnets from each other, assuming that they are all spaced uniformly from each other. This spacing may be approximately equal to 5 mm. In accordance with the program voltage of FIG. 4, the magnets 8 follow each other along a coaxial circular line wherever the signal voltage is to have a constant positive or negative value. As shown in FIG. 3, at the left of the angle $\alpha$, the magnets 8 have their north poles N facing the bridge piece 7 of the transducer head. At the end of the angular range $\alpha$, viewed in the clockwise direction, a south pole S faces the transducer, and three such south poles appear in the intermediate angular range between those denoted in FIG. 3 by $\alpha$ and $\beta$. Due to the reversed poling of the permanent magnets at the beginning and end respectively of the range $\alpha$, there occurs a sudden transition from one maximum value of Hall voltage to the maximum value of the opposite polarity, as shown in angular range $\alpha$ of FIG. 4. For obtaining a gradual transition along the greater angular range $\beta$, the permanent magnets can be located on a chord as apparent from FIG. 3. From the end of range $\alpha$ in FIG. 3 to the middle of range $\beta$, only south poles S face the transducer. Since the south poles in the first half-portion of range $\beta$ become progressively remote radially from the pole face of bridge piece 7, the negative Hall voltage declines gradually. In the middle of range $\beta$ according to FIG. 3 there again occurs a reversal in polarity of the magnet poles, and each subsequent north pole N in range $\beta$ comes closer to the pole face of bridge piece 7 so that the now positive Hall voltage gradually increases up to the positive maximum value.

In the above-described manner the signal voltage to be generated by the device can be given any desired course depending upon the particular program to be performed. The arrangement and magnetic orientation of the permanent magnet can be determined graphically from the curve of the desired signal voltage, or the arrangement of the magnets can follow a calculated curve. Approximately rectangular pulse waves of variable pulse duration and variable pauses can also be obtained by mounting all permanent magnets on a circle but reversing their polarity at the necessary distances from each other. The fronts or flanks of these pulses have a steepness which increases with a decrease in mutual spacing of the magnets. Disturbing influences from extraneous fields can be eliminated by mounting the ferrite plate member 1, having a relatively large mass and a large cross section, outside of the travel path of the permanent magnets.

If the flank steepness of the signal voltage is to be increased to a further extent, the Hall voltage from the signal generator can be fed into a bistable trigger circuit or flip-flop network whose output pulses have virtually perpendicular flanks.

Trigger amplifiers suitable for such purposes are known as such. Applicable for example is the amplifier illustrated and described in the German periodical Elektrotechnische Zeitschrift (ETZ-A) April 1960, pages 323 to 327, FIG. 8.

According to FIG. 5, the signal generating device according to the invention is provided with an electric motor for driving the magnet-carrying disc 12. Firmly secured to the housing of the motor 15 (shown only partially) are bolts 13 and 14 on which a mounting panel 16 is fastened by means of nuts 17, 18. The panel 16 carries one or more transducer heads denoted by 19. The circular disc 12 is seated on the motor shaft 20 and carries the above-mentioned permanent magnets 8 in its peripheral zone. The energizing current for the Hall plates is supplied to terminal bases 21, for example from a battery 22 or other direct-current source of constant voltage, and the same terminal bases also carry the connections from which the Hall voltage is taken and, for example, supplied to an amplifier 23. The contact elements of the terminal bases 21 are suitably connected with the above-described contact strips 3 to 6 (FIG. 2).

By the provision of a plurality of transducer heads 19, as shown in FIG. 5, a corresponding plurality of identical signal voltages or program voltages can be produced with a predetermined phase displacement relative to one another. In addition, a series of further permanent magnets for cooperation with another transducer head can be mounted on the rotating disc in a zone of smaller radial spacing from the axis of rotation. In this manner, a single rotating disc may be used for simultaneously producing two or more different program voltages which have a fixed angular relation to each other.

Due to the relatively small cross section of the ferrite surface that faces the traveling magnet poles, a change or reversal in magnetic flux can be made to become effective upon the Hall plate at a much higher rate of change than attainable in the known devices of this type. This is particularly the case if the cross section of the L-shaped bridge piece is substantially equal to the cross section of the magnetic pole faces at the permanent magnets. As a result, the signal voltage, or any voltage process produced by the device can be given a correspondingly high flank steepness. It will be understood that this is predicated upon the fact that the considerably larger plate member 1 remains remote from the permanent magnets. If, as in the previously proposed devices of this type, the relatively large plate member or a magnetizable part of equivalent size were located close to the path of the traveling magnets, an abrupt change in signal voltage, comparable with the above-mentioned flank steepness, cannot be obtained.

The features described above with reference to a circular disc are analogously applicable to machine components and other structures traveling in linear motion. Continuous and gradual transition corresponding to the one shown in FIG. 4 within the angular range $\beta$, can then be obtained by arranging the permanent magnets not along a straight line but along an inclined curve. In this case, too, a plurality of program voltages can be simultaneously produced in fixed time relation to each other with the aid of two or more series of permanent magnets.

Such and other modifications and variants of my invention will be obvious to those skilled in the art, upon a study of this disclosure, and it will therefore be understood that my invention can be given embodiments other than particularly illustrated and described herein, without departing from the essential features of my invention and within the scope of the claims annexed hereto.

I claim:
1. A signal voltage generating device comprising a Hall generator and movable structure having a given path of travel past the location of said Hall generator and having permanent magnet means mounted on said structure for subjecting said Hall generator to magnetic flux when said magnet means pass by said Hall generator, said Hall generator having a Hall plate with current supply leads and signal voltage output leads and having a ferrite plate member in face-to-face contact with said Hall plate, and said Hall generator having a substantially L-shaped bridge piece of ferrite, said bridge piece having one planar end face-to-face with said Hall plate at the side opposite said ferrite plate member and having its other end facing said travel path for directing magnetic flux from said magnet means through said Hall plate.

2. In a signal voltage generating device according to claim 1, said bridge piece having a cross-sectional width approximately equal to that of said magnet means at each pole face coactive with said bridge piece.

3. A signal voltage generating device comprising a rotatable circular disc, a peripheral row of pin-shaped permanent magnets mounted on said disc and having respective axes parallel to the axis of rotation of said disc, a Hall generator stationarily mounted near said disc in the field range of said magnets to provide a signal voltage varying during rotation of said disc due to the magnetic fields of said respective magnets, some of said magnets being different from others in said row as regards their effective magnetic fields relative to said Hall generator and in accordance with a given signal voltage characteristic, said Hall generator having a Hall plate and a ferrite plate member in face-to-face relation to each other in a plane parallel to that of said disc, and said Hall generator having a substantially L-shaped bridge piece of ferrite, said bridge piece having one planar end face-to-face with said Hall plate at the side opposite said ferrite plate member and having its other end facing said disc for directing magnetic flux from said respective magnets through said Hall plate.

4. In a signal voltage generating device according to claim 3, some of said magnets having at the disc side of said Hall generator a polarity different from that of others, and some of said magnets having a different radial spacing from the disc axis than others, said differences in polarity and spacing being in accordance with a given cyclical characteristic of the signal voltage.

References Cited by the Examiner

UNITED STATES PATENTS

| | | | |
|---|---|---|---|
| 2,536,805 | 1/51 | Hansen | 340—345 |
| 2,993,159 | 7/61 | De Vol | 318—254 |
| 3,097,296 | 7/63 | Chasmar et al. | 324—45 |

LLOYD McCOLLUM, *Primary Examiner.*

ROBERT C. SIMS, *Examiner.*